US012762766B2

(12) United States Patent
Aiba

(10) Patent No.: US 12,762,766 B2
(45) Date of Patent: Oct. 13, 2026

(54) INFORMATION PROCESSING DEVICE

(71) Applicant: NTT DOCOMO, INC., Tokyo (JP)

(72) Inventor: Kunihiro Aiba, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 18 days.

(21) Appl. No.: 19/100,750

(22) PCT Filed: Jul. 19, 2023

(86) PCT No.: PCT/JP2023/026391
§ 371 (c)(1),
(2) Date: Feb. 3, 2025

(87) PCT Pub. No.: WO2024/089954
PCT Pub. Date: May 2, 2024

(65) Prior Publication Data

US 2026/0038166 A1 Feb. 5, 2026

(30) Foreign Application Priority Data

Oct. 27, 2022 (JP) ................................ 2022-172224

(51) Int. Cl.
*G06T 11/26* (2026.01)
*G06T 5/10* (2006.01)

(52) U.S. Cl.
CPC ................ *G06T 11/26* (2026.01); *G06T 5/10* (2013.01); *G06T 2207/20064* (2013.01)

(58) Field of Classification Search
CPC . G06T 11/26; G06T 5/10; G06T 2207/20064; G06Q 30/0203
See application file for complete search history.

(56) References Cited

FOREIGN PATENT DOCUMENTS

| | | |
|---|---|---|
| JP | 2005-141708 A | 6/2005 |
| JP | 2006-48319 A | 2/2006 |
| JP | 2019-128736 A | 8/2019 |

OTHER PUBLICATIONS

Axelsson, F., & Gueorguiev, P. (2017). Human activity classification using simulated micro-dopplers and time-frequency analysis in conjunction with machine learning algorithm.*
International Preliminary Report on Patentability and Written Opinion issued May 8, 2025, in PCT/JP2023/026391, 6 pages.
International Search Report issued Oct. 10, 2023 in PCT Application No. PCT/JP2023/026391 filed Jul. 19, 2023, citing documents 16-17 therein, 2 pages.
Japanese Office Action issued Feb. 17, 2026, in corresponding Japanese Patent Application No. 2024-552831 (with English Translation), 6 pages.

* cited by examiner

*Primary Examiner* — Sarah Lhymn
(74) *Attorney, Agent, or Firm* — Oblon, McClelland, Maier & Neustadt, L.L.P.

(57) ABSTRACT

An information processing device (10) includes: a waveform data generation unit (12) that, from action data related to acquired action of a user and including a type and an execution time information of the action, obtains a timing in time series of an event related to action characteristics of the user and connects the timings adjacent in time series with a predetermined waveform, to generate waveform data for each action; and an image generation unit (13) that generates a two-dimensional image representing the action characteristics of the user by performing power spectrum imaging on the generated waveform data.

6 Claims, 12 Drawing Sheets

| USER ID | ACTION TYPE | EXECUTION TIME |
|---|---|---|
| XXX | APP ACTIVATION | 2021/09/01 18:30:31 |
| XXX | PURCHASE | 2021/09/01 18:35:31 |
| YYY | APP ACTIVATION | 2021/09/04 19:54:19 |
| YYY | APP ACTIVATION | 2021/09/05 13:31:11 |
| ⋮ | ⋮ | ⋮ |

FOLLOWING IMAGES ARE INPUT TO LEARNING MODEL AS EXPLANATORY VARIABLES TO ESTIMATE SERVICE SATISFACTION LEVEL (NPS) AS RESPONSIBLE VARIABLE

FOLLOWING IMAGES ARE INPUT TO LEARNING MODEL AS EXPLANATORY VARIABLES TO ESTIMATE SERVICE SATISFACTION LEVEL (NPS) AS RESPONSIBLE VARIABLE

INFORMATION PROCESSING DEVICE

TECHNICAL FIELD

A present disclosure relates to an information processing device that generates a two-dimensional image representing action characteristics of a user, in which the generated two-dimensional image is used as, for example, an explanatory variable in machine learning.

BACKGROUND ART

In a case of estimating information (response variable) on action characteristics of a user from user action data (explanatory variable) using machine learning, it is important to generate and use an explanatory variable having a sufficient amount of information in order to accurately estimate the response variable. In general, the user action data is often input to a learning model as a total number (statistical value) of targets (for example, action starts) within a certain period. In addition, Patent Literature 1 discloses a technology of generating a pie chart and a bar graph representing information on action in time series in order to easily grasp a type of the action, an action time, and a quality of the action for a user action on a certain day.

CITATION LIST

Patent Literature

[Patent Literature 1] Japanese Unexamined Patent Publication No. 2019-128736

SUMMARY OF INVENTION

Technical Problem

In recent years, there has been a need to predict an indicator that is not determined immediately or in the short term, such as a satisfaction level of the user with a service, via machine learning, and in order to meet such a need, it is required to appropriately capture characteristics formed in the medium to long term. However, in the technology of Patent Literature 1, it is difficult to appropriately add information that changes in time series, such as an execution frequency and an execution cycle of actions of various users, as an explanatory variable in machine learning.

The present disclosure has been made in view of the above-described circumstances, and an object of the present disclosure is to appropriately acquire information that is related to actions of various users and that changes in time series.

Solution to Problem

The present disclosure provides an information processing device including: a waveform data generation unit that, from action data including an action type and an execution time information related to an acquired action of a user, obtains a timing in time series of an event related to action characteristics of the user and connects the timings adjacent in time series with a predetermined waveform, to generate waveform data for each action; and an image generation unit that generates a two-dimensional image representing the action characteristics of the user by performing power spectrum imaging on the generated waveform data.

In the information processing device, the waveform data generation unit generates the waveform data for each action by obtaining, from the action data including the action type and the execution time information related to the acquired action of the user, the timing in time series of the event related to the action characteristics of the user to connect the timings adjacent in time series with the predetermined waveform. The waveform data for each action can represent information that changes in time series, such as an execution frequency and an execution cycle of the action of the user. Then, the image generation unit that generates the two-dimensional image representing the action characteristics of the user by performing the power spectrum imaging on the generated waveform data. As a result, it is possible to appropriately acquire the information that changes in time series regarding various types of actions of the user. Such information can be used as the explanatory variable in the machine learning, and is very effective in, for example, predicting an indicator that is formed in the medium to long term (indicator that is not determined immediately or in the short term), such as the service satisfaction level for the user, by the machine learning, and is very useful in accurately estimating the indicator as described above.

Advantageous Effects of Invention

According to the present disclosure, it is possible to appropriately acquire the information that is related to actions of various users and that changes in time series.

DESCRIPTION OF EMBODIMENTS

Hereinafter, various embodiments according to the present disclosure will be described with reference to the drawings. Hereinafter, as a first embodiment, a basic form embodiment will be described in which waveform data for each action is generated by connecting timings in time series of an event related to action characteristics from action data of a user, and a two-dimensional image representing action characteristics of the user is generated by performing power spectrum imaging on single waveform data. And, as a second embodiment, an embodiment will be described in which processing of combining related waveform data among a plurality of generated waveform data is further performed. Various actions are included in the "action of the user". However, in the following first and second embodiments, in order to obtain an indicator formed in the medium to long term, such as a satisfaction level of service to be targeted (hereinafter, abbreviated as "service") for the user, the "action of the user" will be described as an example of the action of the user using the service.

FIRST EMBODIMENT

Figure 1:
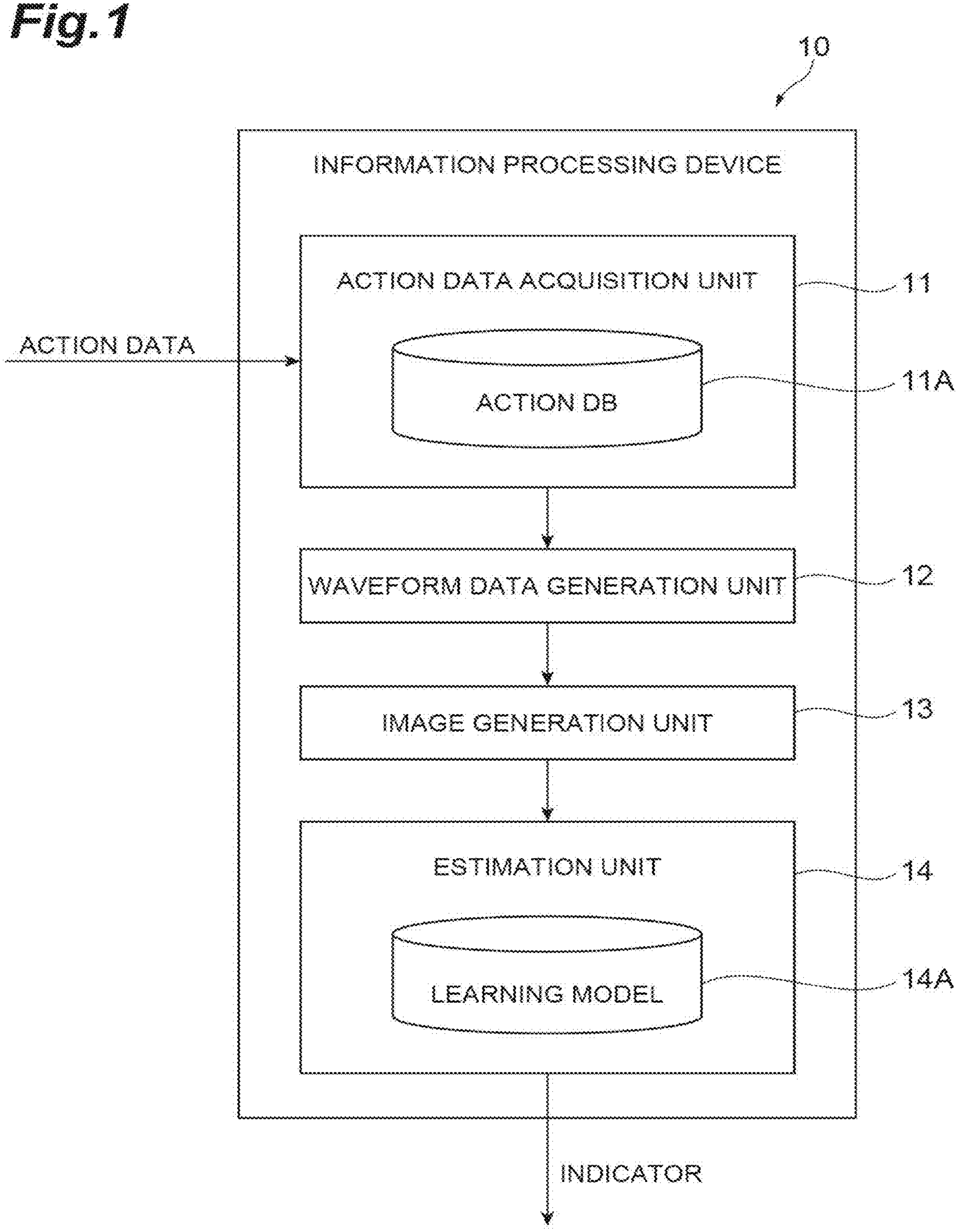
FIG. 1 is a functional block configuration diagram of an information processing device according to first and second embodiments.

As shown in FIG. 1, an information processing device 10 according to the first embodiment includes an action data acquisition unit 11, a waveform data generation unit 12, an image generation unit 13, and an estimation unit 14, as functional blocks for implementing the functions according to the present disclosure. Hereinafter, the function of each unit will be briefly described. The details of the function will be described in the description of the processing with reference to FIG. 2.

The action data acquisition unit 11 is a functional unit that acquires action data that is related to actions of various users and that includes a type and execution time information related to the action from external devices (for example, mobile terminals 20 (FIG. 3) of various users) and stores the acquired action data for each user in a built-in action database 11A.

The waveform data generation unit 12 is a functional unit that obtains the timing in time series of the event related to the action characteristics of the user from the action data, and connects the timings adjacent to each other in time series with a predetermined waveform to generate waveform data for each action. Examples of the event related to the action characteristics of the user include the activation of an application (hereinafter, abbreviated as "app") in the service and the purchase in the service. In addition, examples of the "predetermined waveform" connecting the timings adjacent to each other in time series include a sine wave, a cosine wave, and a triangular wave. The waveform data generation unit 12 may have a function of combining the related waveform data among the plurality of generated waveform data, and the function of combining the waveform data will be described in the second embodiment.

The image generation unit 13 is a functional unit that generates a two-dimensional image representing the action characteristics of the user by performing power spectrum imaging on the generated waveform data. Examples of the above-described power spectrum imaging include processing such as continuous Fourier transform and wavelet transform.

The estimation unit 14 is a functional unit that inputs the two-dimensional image (two-dimensional image representing the action characteristics related to the use of the service of the user) generated by the image generation unit 13 as an explanatory variable to a learning model 14A in which the action characteristic information of the user is used as an explanatory variable and a predetermined indicator (indicator formed in the medium to long term (indicator that is not determined immediately or in the short term), here, as an example, indicator related to the service satisfaction level) is used as a response variable, to estimate the indicator. It is assumed that the learning model 14A has already been generated by supervised learning in which the past user action characteristic information is used as an explanatory variable and an indicator related to the service satisfaction level is used as a response variable, and the learning model 14A is included in the estimation unit 14. In addition, the estimation unit 14 outputs the obtained estimation result (indicator) as appropriate. For example, the estimation result (indicator) may be displayed and output or printed and output by a predetermined operation of an operator of the information processing device 10.

Next, processing executed in the information processing device 10 will be described with reference to FIGS. 3 to 7 in accordance with a flowchart of FIG. 2. First, the action data acquisition unit 11 acquires the action data including the action type and the execution time information related to the actions of various users from the external devices (for example, the mobile terminal 20 of the user shown in FIG. 3) and stores the acquired action data for each user in the action database 11A (step S1 in FIG. 2). For example, as shown in FIG. 3, the action data acquired and stored here includes information such as a user ID for identifying the user, an action type, and an execution time, and, among these information, examples of the action type include information such as an app activation in the service and a purchase in the service.

Figure 2:
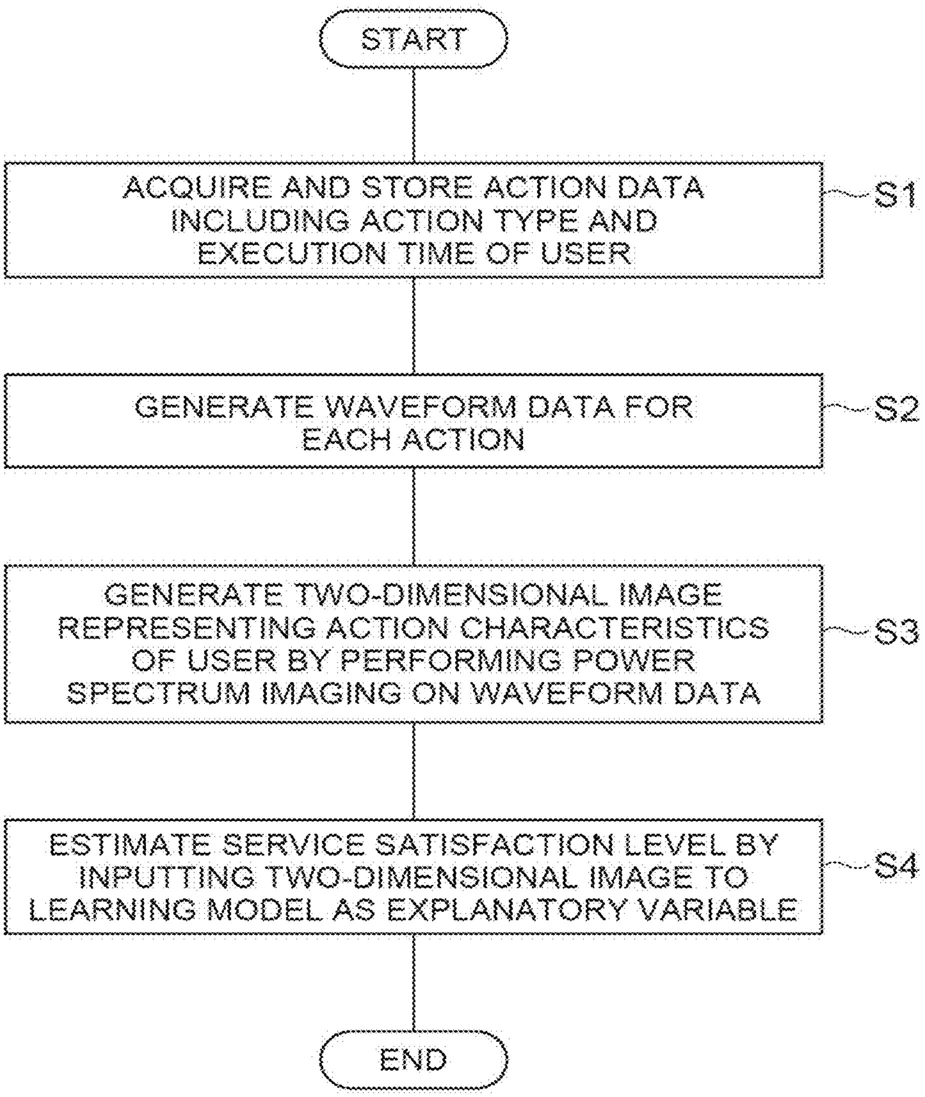
FIG. 2 is a flowchart showing processing according to the first embodiment.
Figure 3:
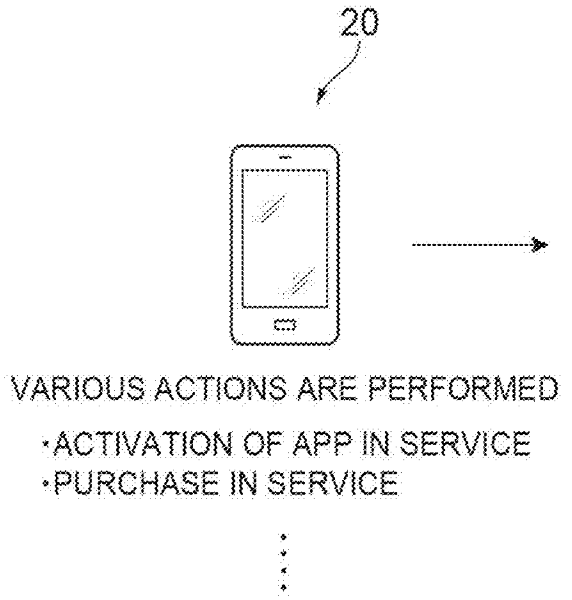
FIG. 3 is a diagram showing acquisition of action data.
Figure 4:
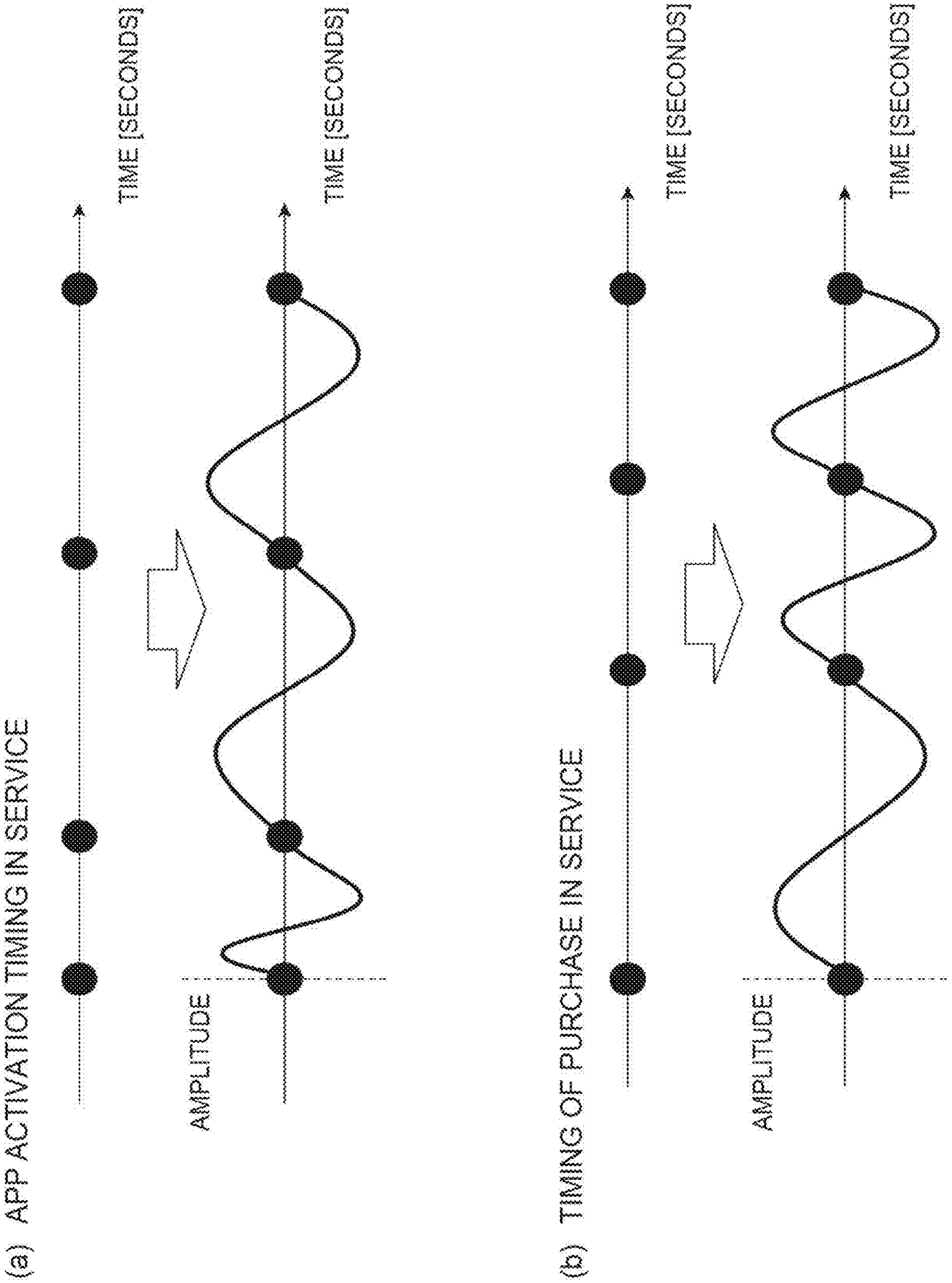
FIG. 4 (*a*) is a diagram showing waveform data generation related to an app activation timing in a service, and FIG. 4 (*b*) is a diagram showing waveform data generation related to a purchase action timing in the service.
Figure 5:
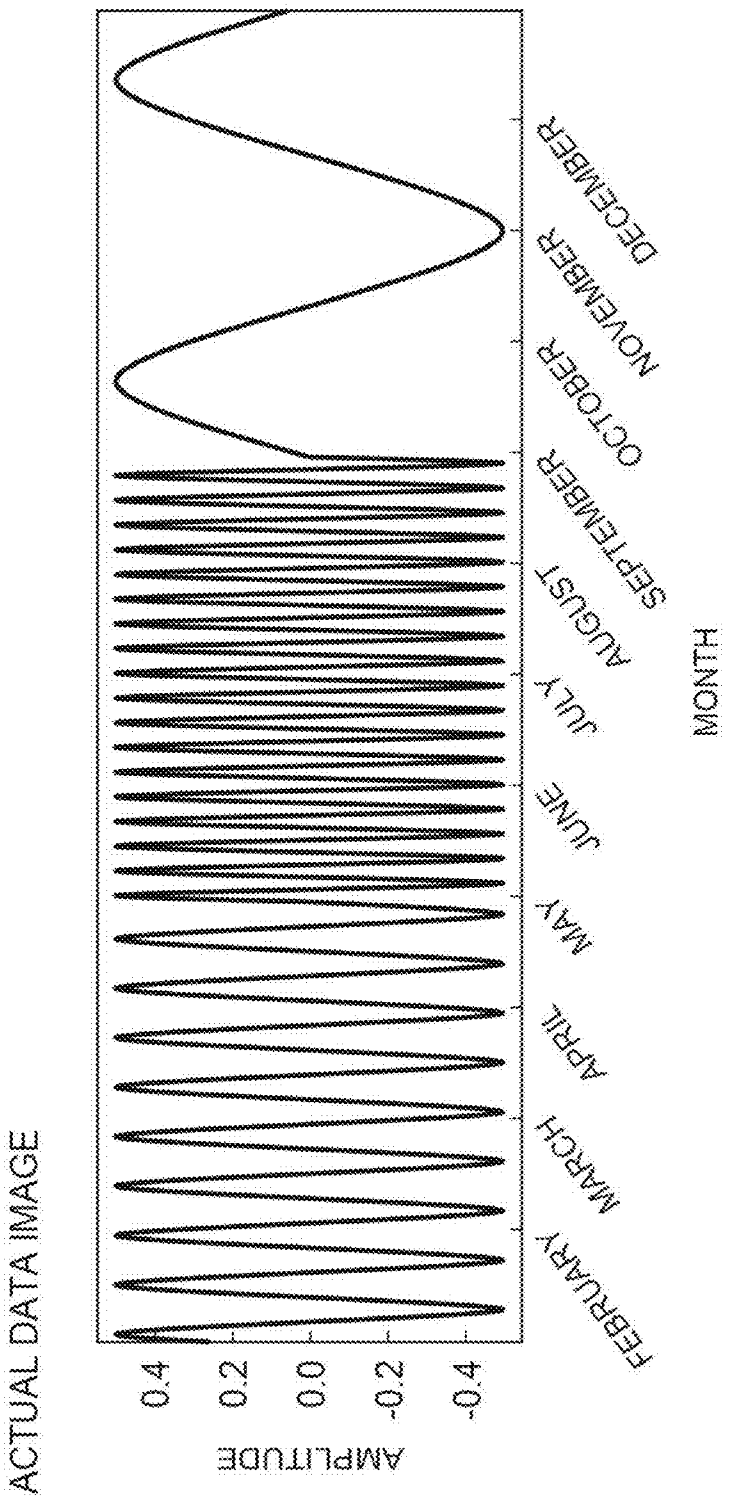
FIG. 5 is a diagram showing an actual data image of the waveform data to be generated.

Next, the waveform data generation unit 12 obtains, from the action data of the user to be targeted (target user), the timing in time series of the event related to the action characteristics of the target user, and connects the timings adjacent to each other in time series with a predetermined waveform (here, a sine wave) to generate the waveform data for each action (step S2 in FIG. 2). For example, FIG. 4 (*a*) shows an example in which the waveform data related to the app activation in the service is generated by obtaining a timing in time series at which the app is activated in the service and connecting the timings adjacent to each other in time series with the sine wave, and FIG. 4 (*b*) shows an example in which the waveform data related to the purchase in the service is generated by obtaining a timing in time series at which the purchase is made in the service and connecting the timings adjacent to each other in time series with the sine wave. In addition, FIG. 5 shows an actual data image of the waveform data to be generated, and it can be seen that the frequency changes at a certain timing in time series. Since the generated waveform data is generated in order to grasp information that can change in time series, such as an execution frequency and an execution cycle of the action, the amplitude of the vertical axis is not limited to a predetermined value and may be arbitrarily determined. For example, FIG. 4 (*a*), FIG. 4 (*b*), and FIG. 5 show an example in which the waveform data of the sine wave is generated such that the maximum amplitude is aligned with a certain value.

Figure 6:
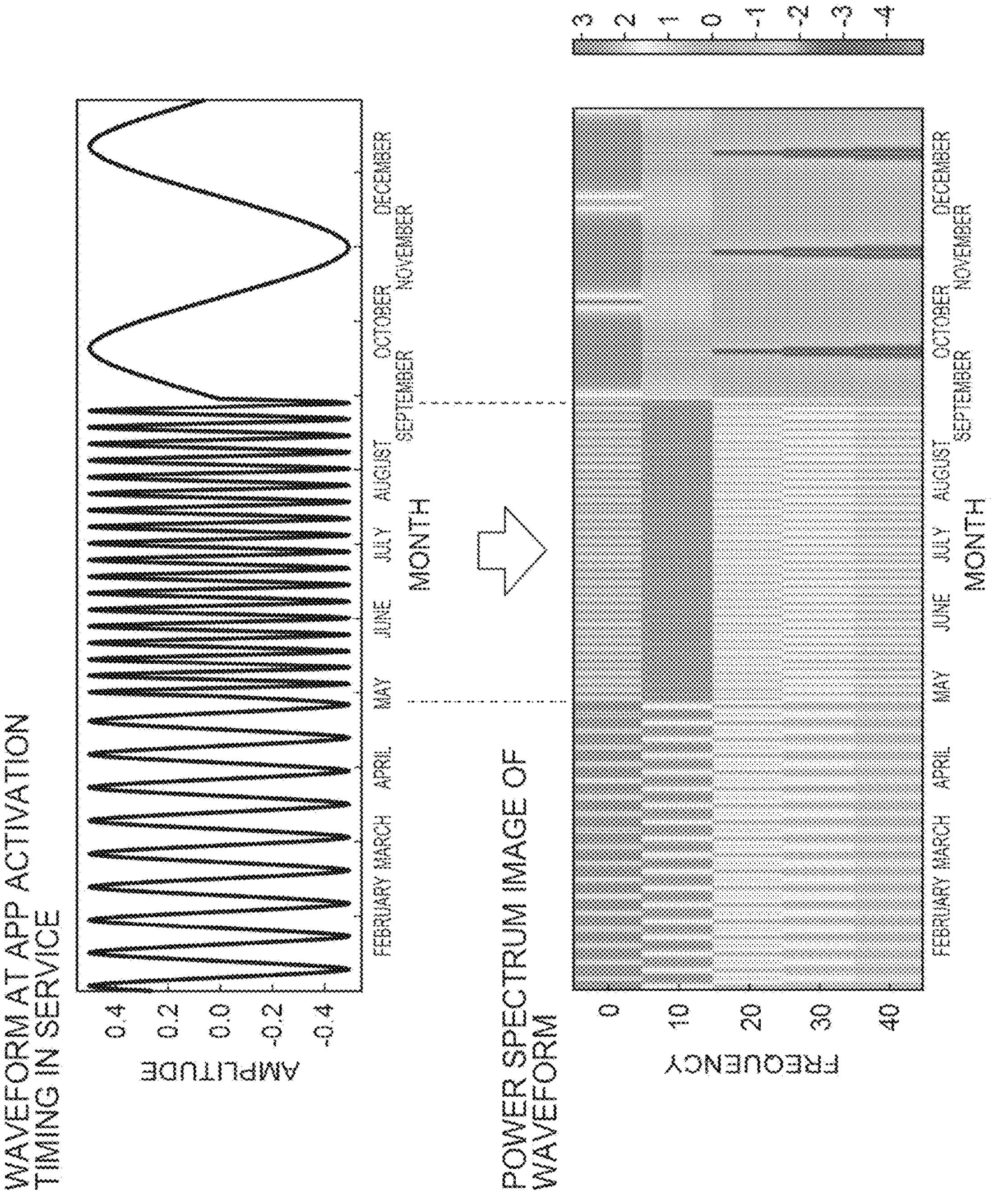
FIG. 6 is a diagram showing generation of a power spectrum image of a waveform.

Next, the image generation unit 13 generates the two-dimensional image representing the action characteristics of the user by performing the power spectrum imaging on the generated waveform data (step S3 in FIG. 2). For example, FIG. 6 shows an example in which the power spectrum imaging is performed on the waveform data (FIG. 5) at the timing of the event (the app activation in a certain service) related to the action characteristics of the target user, to generate the two-dimensional image representing the action characteristics of the user.

Figure 7:
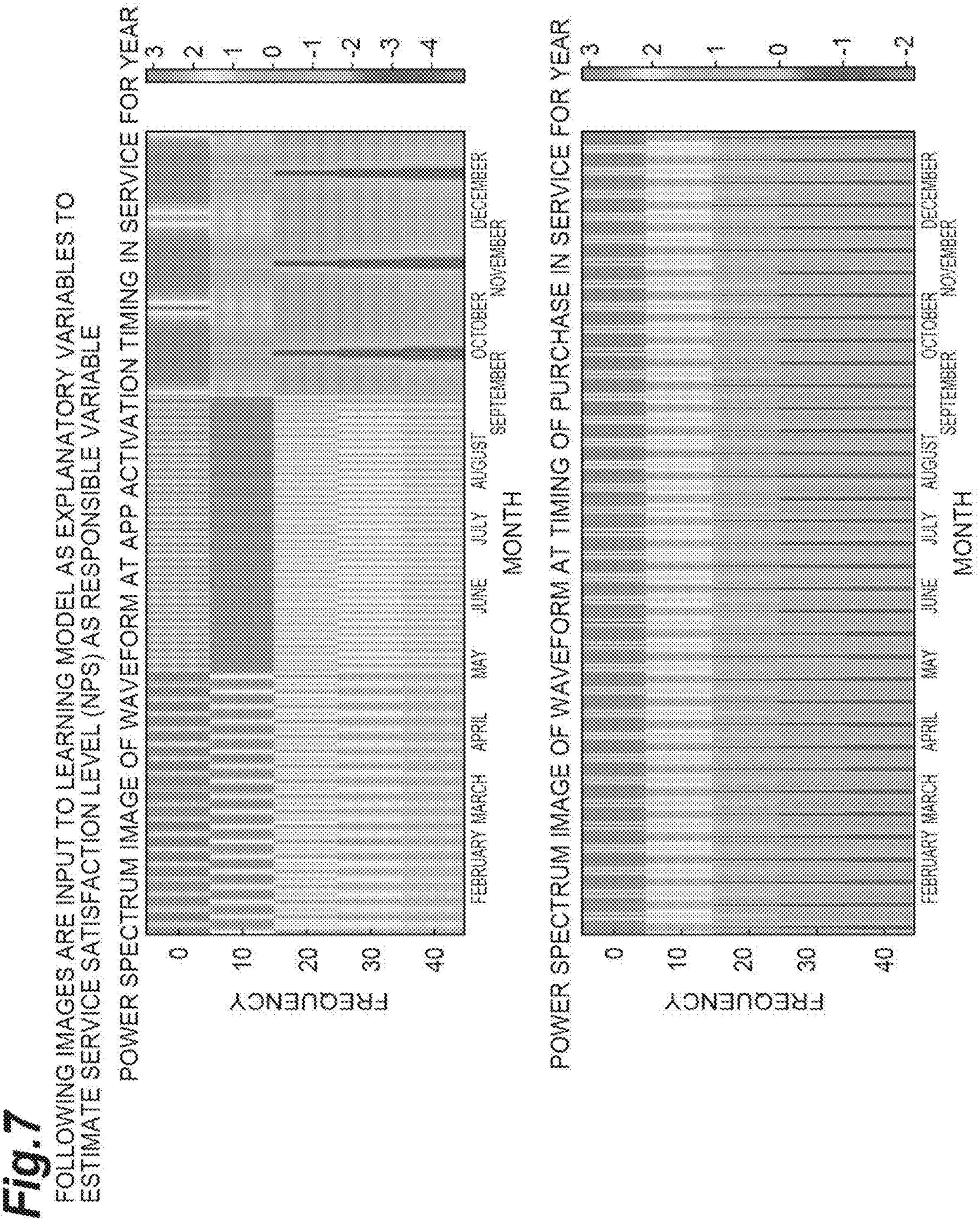
FIG. 7 is a diagram showing an example in which a generated power spectrum image is used as an explanatory variable.

Further, the estimation unit 14 inputs the two-dimensional image generated in step S3 as an explanatory variable to the learning model 14A, to estimate a predetermined indicator (here, an indicator related to the service satisfaction level) as a response variable (step S4 in FIG. 2). FIG. 7 shows an example in which two two-dimensional images (that is, a power spectrum image of a waveform at an app activation timing in the service in a year and a power spectrum image of a waveform at a timing of the purchase in the service in a year) are input to the learning model 14A as explanatory variables, and the estimation result such as an indicator (for example, a net promoter score (NPS)=3) related to the service satisfaction level is obtained as a response variable. The estimation result (indicator related to the service satisfaction level) is displayed and output or printed and output by, for example, the predetermined operation by the operator of the information processing device 10.

According to the first embodiment described above, the power spectrum imaging is performed on the waveform data that can represent the information that changes in time series, such as the execution frequency and the execution cycle of the user action, to generate the two-dimensional image representing the action characteristics of the user. As a result, it is possible to appropriately acquire information (information related to the execution frequency, the execution cycle, and the like) that changes in time series and is related to various actions that have not been obtained in the table data and the like in the related art. Such information can be used as the explanatory variable in the machine learning, and is very effective in, for example, predicting an indicator that is formed in the medium to long term (indicator that is not determined immediately or in the short term), such as the service satisfaction level for the user, by the machine learning. Accordingly, it is possible to accurately estimate an indicator such as the service satisfaction level that is formed in the medium to long term and to establish an improvement policy for an appropriate service at an early stage.

In addition, as compared with a case in which the table data or the like in the related art is used, for example, time-series information such as (a) the number of times of use in a certain month, (b) the number of times of use in the next month, and (c) the number of times of use in the month after the next, which are created one by one in the table data, can be represented by one feature value (explanatory variable in machine learning), and the machine learning based on the overall tendency from the similarity of the generated two-dimensional images and the like can be performed. In addition, there is an advantage that the feature value (explanatory variable in machine learning) can be obtained without determining the cycle of data acquisition in advance, unlike a case of using the table data or the like in the related art.

SECOND EMBODIMENT

Hereinafter, as the second embodiment, an embodiment will be described in which the processing of combining the related waveform data among the plurality of generated waveform data is further performed.

Since the configuration of the information processing device 10 according to the second embodiment is the same as the configuration of the information processing device 10 according to the first embodiment (FIG. 1), the duplicate description will be omitted. However, the waveform data generation unit 12 has a function of generating the waveform data for each action of the target user and combining (for example, multiplying, adding, or the like) the waveform data in a case in which the waveform data (related waveform data) of the related waveform data in a case in which the waveform data (related waveform data) of the actions related to each other. In addition, the image generation unit 13 has a function of generating the two-dimensional image representing the action characteristics of the user by performing the power spectrum imaging on the waveform data combined by the waveform data generation unit 12 in addition to the power spectrum imaging on the single waveform data, as in the first embodiment.

Figure 9:
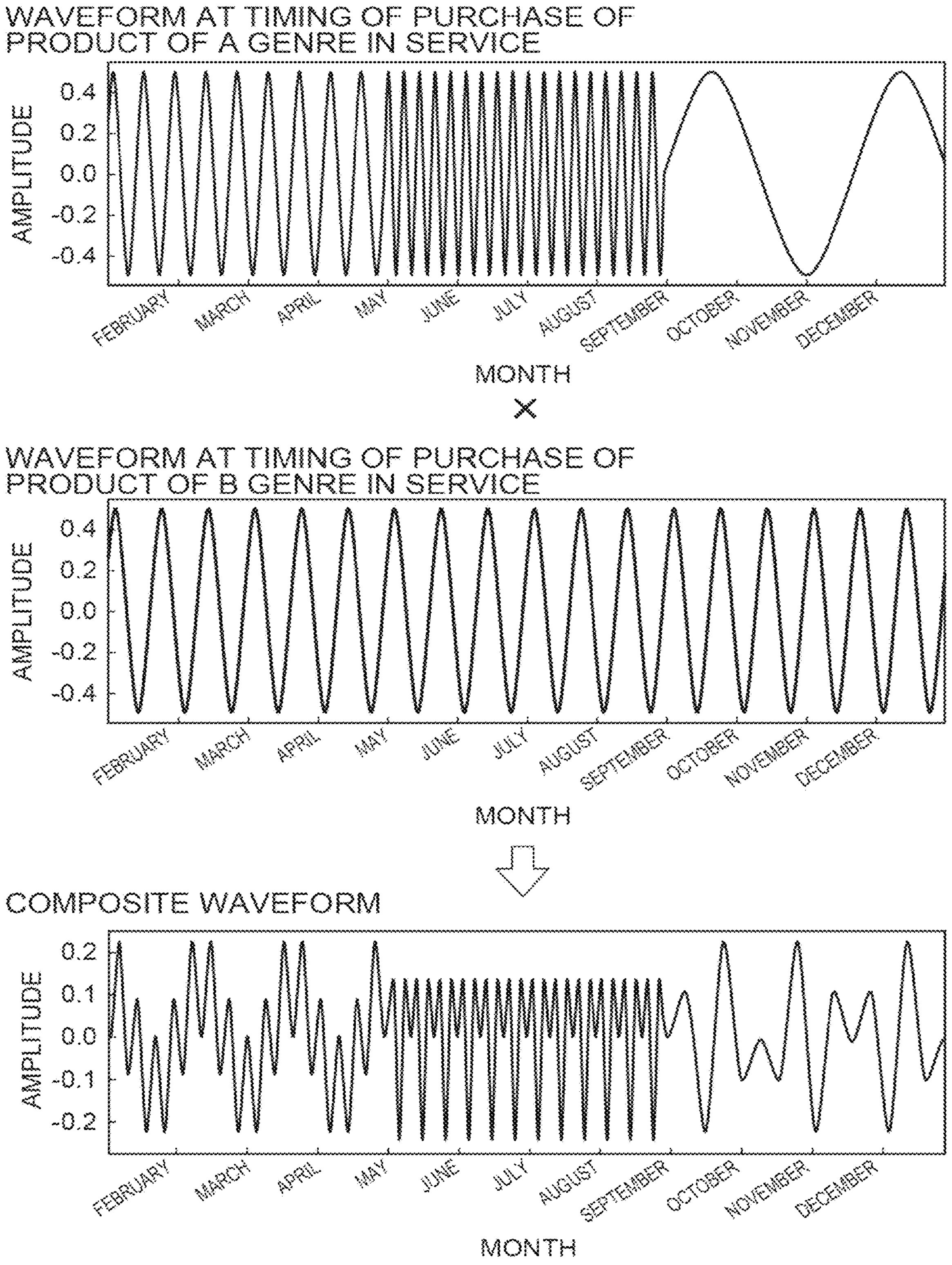
FIG. 9 is a diagram showing combination of the waveforms.
Figure 10:
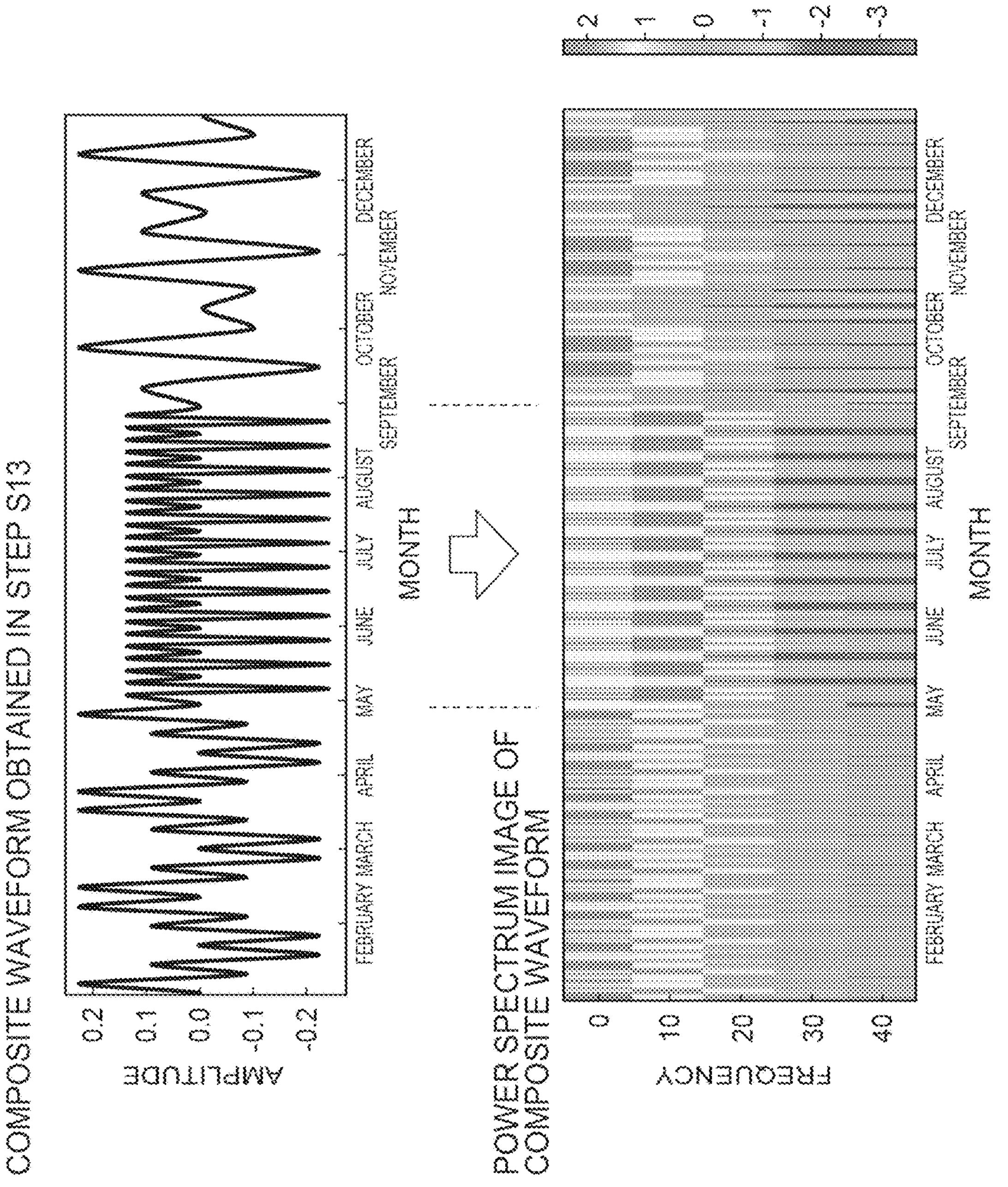
FIG. 10 is a diagram showing generation of the power spectrum image from a composite waveform.
Figure 11:
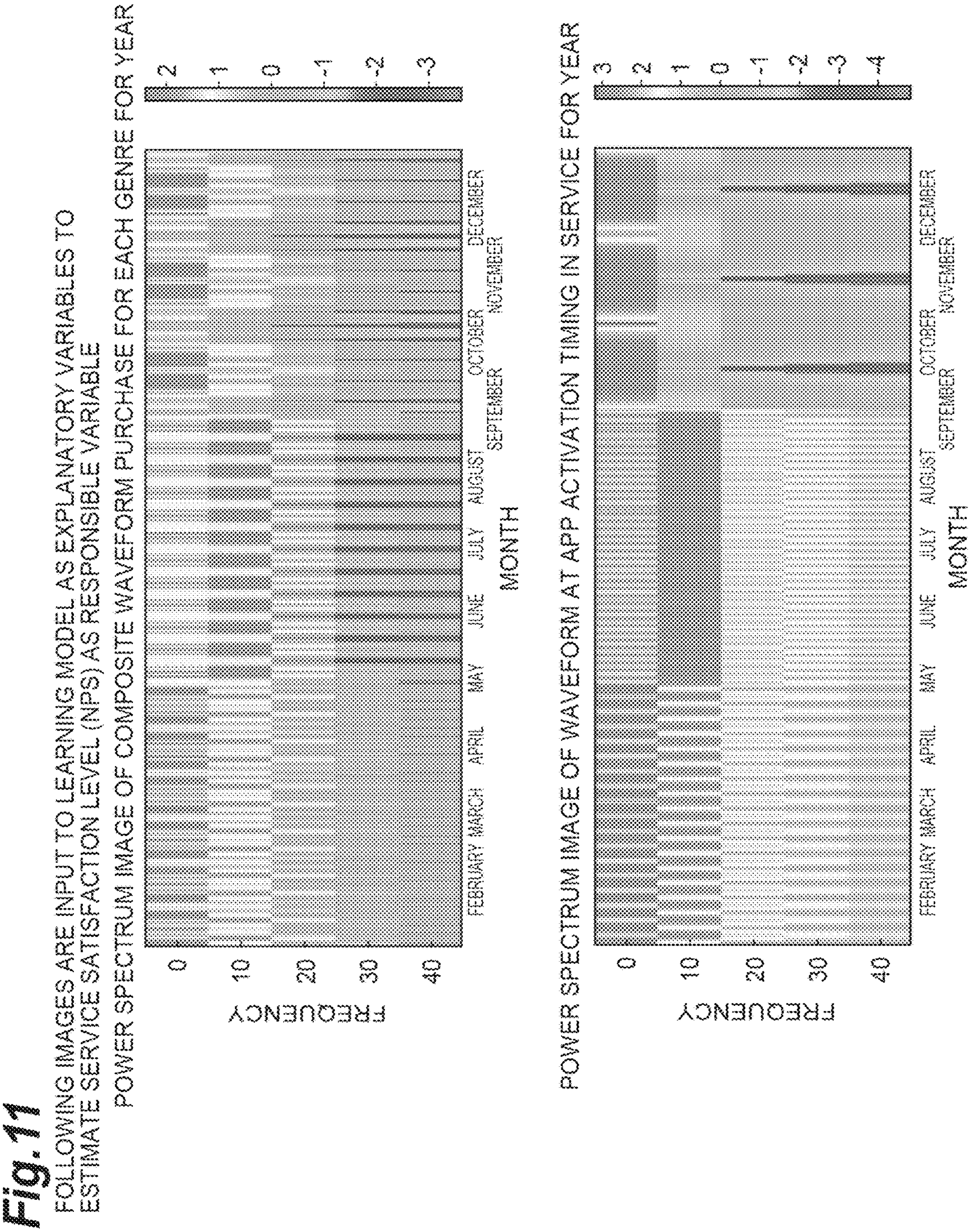
FIG. 11 is a diagram showing an example in which the power spectrum image generated from the composite waveform is used as the explanatory variable.

Next, processing executed in the information processing device 10 will be described with reference to FIGS. 9 to 11 in accordance with a flowchart of FIG. 8.

Figure 8:
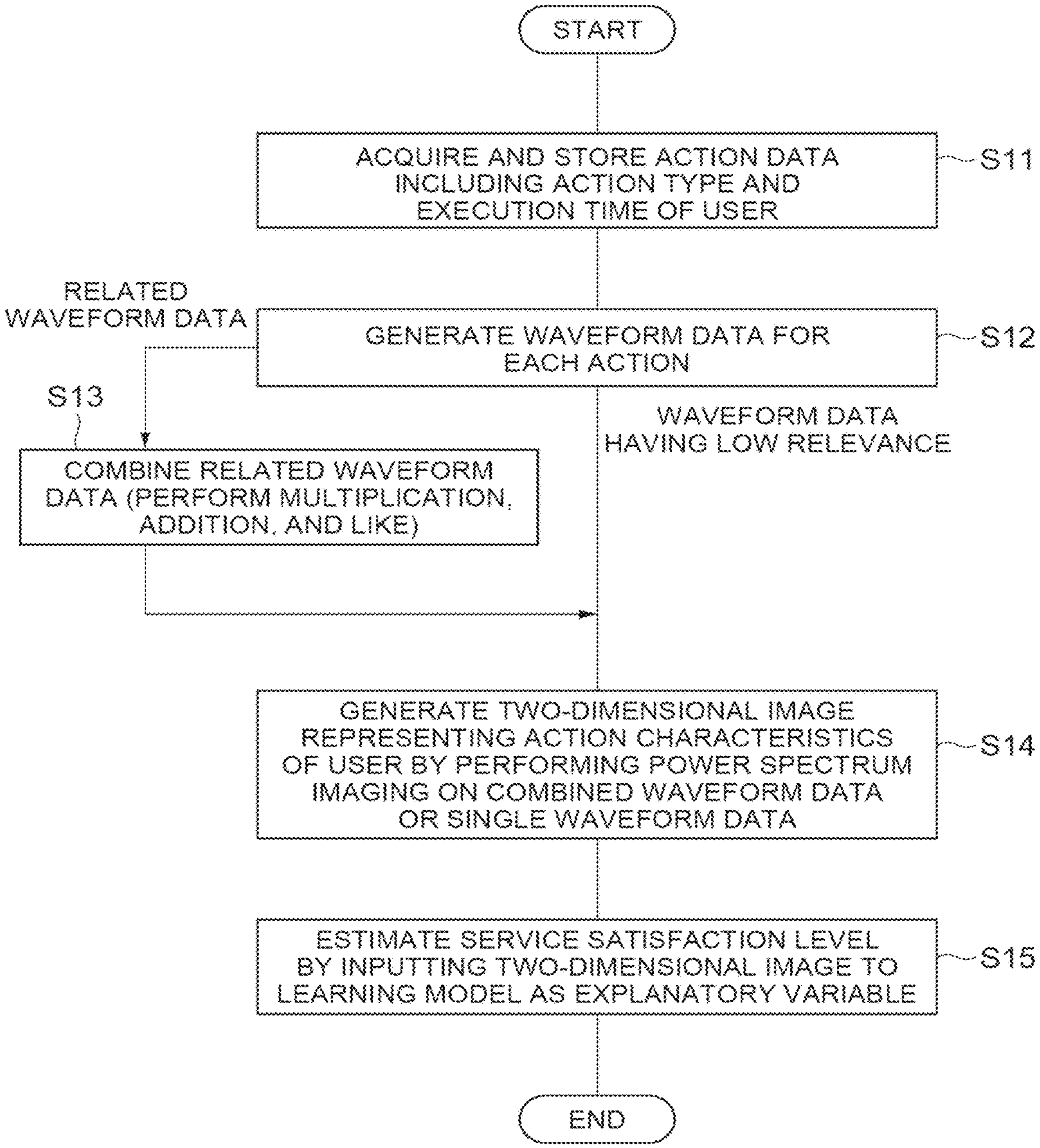
FIG. 8 is a flowchart showing processing according to the second embodiment.

First, as in the first embodiment, the action data acquisition unit 11 acquires the action data including the action type and the execution time information related to the actions of various users from the external devices (for example, the mobile terminal 20 of the user shown in FIG. 3) and stores the acquired action data for each user in the action database 11A (step S11 in FIG. 8).

Next, the waveform data generation unit 12 obtains, from the action data of the user to be targeted (target user), the timing in time series of the event (here, the app activation in the service, the purchase in the service, and the like) related to the action characteristics of the target user, and connects the timings adjacent to each other in time series with the predetermined waveform (here, the sine wave) to generate the waveform data for each action (step S12 in FIG. 8). For example, FIG. 9 shows an example in which the waveform data at a timing of purchasing a product of a genre A in the service and waveform data at a timing of purchasing a product of a genre B in the same service are generated.

Further, in step S12, the waveform data generation unit 12 determines whether or not there is the waveform data of the actions related to each other (related waveform data), and, in a case in which there is the related waveform data, the waveform data generation unit 12 combines the related waveform data (for example, performs multiplication, addition, and the like: step S13 in FIG. 8). FIG. 9 shows an example in which the waveform data at the timing of purchasing the product of the genre A in the service and the waveform data at the timing of purchasing the product of the genre B in the service are determined as the related waveform data, and these waveform data are combined to generate the composite waveform shown in a lower part of FIG. 9.

Then, the waveform data generation unit 12 generates the two-dimensional image representing the action characteristics of the user by performing the power spectrum imaging on the combined waveform data or the single waveform data (Step S14 in FIG. 8). FIG. 10 shows an example in which the power spectrum imaging is performed on the waveform data (composite waveform data) combined in step S13, to generate the two-dimensional image representing the action characteristics of the user.

Further, the estimation unit 14 estimates a predetermined indicator (indicator related to the service satisfaction level in this case) by inputting the two-dimensional image generated in step S14 to the learning model 14A as the explanatory variable, as in the first embodiment (step S15 in FIG. 8). FIG. 11 shows an example in which two two-dimensional images (that is, a power spectrum image of a composite waveform of the purchase for each genre for one year and a power spectrum image of a waveform at an app activation timing in the service for one year) are input to the learning model 14A as explanatory variables, and the estimation result such as the indicator (for example, a net promoter score (NPS)=3) related to the service satisfaction level is obtained as a response variable. The estimation result (indicator related to the service satisfaction level) is displayed and output or printed and output by, for example, the predetermined operation by the operator of the information processing device 10.

According to the second embodiment described above, in addition to the effects described in the first embodiment, the waveform data of the actions related to each other can be combined (for example, multiplied, added, or the like) to generate the composite waveform, the power spectrum imaging can be performed on the composite waveform to generate the two-dimensional image, and the obtained two-dimensional image (that is, information with a rich amount of information including the relevance, interaction, and the like between the types of action) can be used as the explanatory variable to be input to the learning model for estimating the service satisfaction level. As a result, the service satisfaction level can be estimated with higher accuracy by using the explanatory variable having a sufficient amount of information.

In the first and second embodiments, as the "action of the user", the action of the user related to the use of the service has been described as the "indicator" determined in the medium to long term, and the indicator related to the service satisfaction level of the user has been described as an example, but the "action of the user" and the "indicator" are not limited thereto. The "indicator" to be estimated can be widely applied to a predictive indicator related to the use of the service, such as an indicator related to the intention of the user to continue the service, in addition to the indicator related to the service satisfaction level of the user. In addition, in addition to the sine wave, a cosine wave or a triangular wave may be adopted as the waveform data. In addition, as the power spectrum imaging, processing such as continuous Fourier transform or wavelet transform can be adopted.

The gist of the present disclosure is in the following [1] to [4].

[1] An information processing device including: a waveform data generation unit that, from action data including an action type and an execution time information related to an acquired action of a user, obtains a timing in time series of an event related to action characteristics of the user and connects the timings adjacent in time series with a predetermined waveform, to generate waveform data for each action; and an image generation unit that generates a two-dimensional image representing the action characteristics of the user by performing power spectrum imaging on the generated waveform data.

[2] The information processing device according to [1], in which the waveform data generation unit generates waveform data of each of a plurality of types of action related to each other and combines a plurality of obtained waveform data by using a predetermined method, to generate one waveform data related to the plurality of actions.

[3] The information processing device according to [1] or [2], further including: an estimation unit that inputs the two-dimensional image generated by the image generation unit and representing the action characteristics of the user, as an explanatory variable, to a learning model that uses action characteristic information of the user as an explanatory variable and uses a predetermined indicator as a response variable, to estimate the indicator.

[4] The information processing device according to [3], in which the action is an action related to use of a service to be targeted, and the estimation unit estimates an indicator related to the use of the service of the user by using, as the explanatory variable, a two-dimensional image generated by the image generation unit and representing action characteristics related to the use of the service of the user.

[5] The information processing device according to any one of to [4], in which the predetermined waveform includes at least one of a sine wave, a cosine wave, or a triangular wave.

[6] The information processing device according to any one of [1] to [5], in which the power spectrum imaging includes at least one of a continuous Fourier transform or a wavelet transform.

(Description of Terms, Description of Hardware Configuration (FIG. 12), and Like)

The block diagram used in the description of the above-described embodiment shows blocks in functional units. These functional blocks (components) are implemented by any combination of at least one of hardware or software. In addition, a method of implementing each functional block is not particularly limited. That is, each functional block may be implemented by using one device that is physically or logically coupled, or may be implemented by connecting two or more devices that are physically or logically separated directly or indirectly (for example, using wired or wireless connections), and using these plurality of devices. The functional block may be implemented by combining software with the one device or the plurality of devices described above.

The functions include, but are not limited to, determining, judging, calculating, computing, processing, deriving, investigating, looking up, search, inquiry, ascertaining, receiving, transmitting, outputting, accessing, resolving, selecting, choosing, establishing, comparing, assuming, expecting, regarding, broadcasting, notifying, communicating, forwarding, configuring, reconfiguring, allocating, mapping, and assigning. For example, the functional block (component) that functions to perform transmission is referred to as a transmitting unit or a transmitter. In any case, as described above, the method of implementing the above-described method is not particularly limited.

Figure 12:
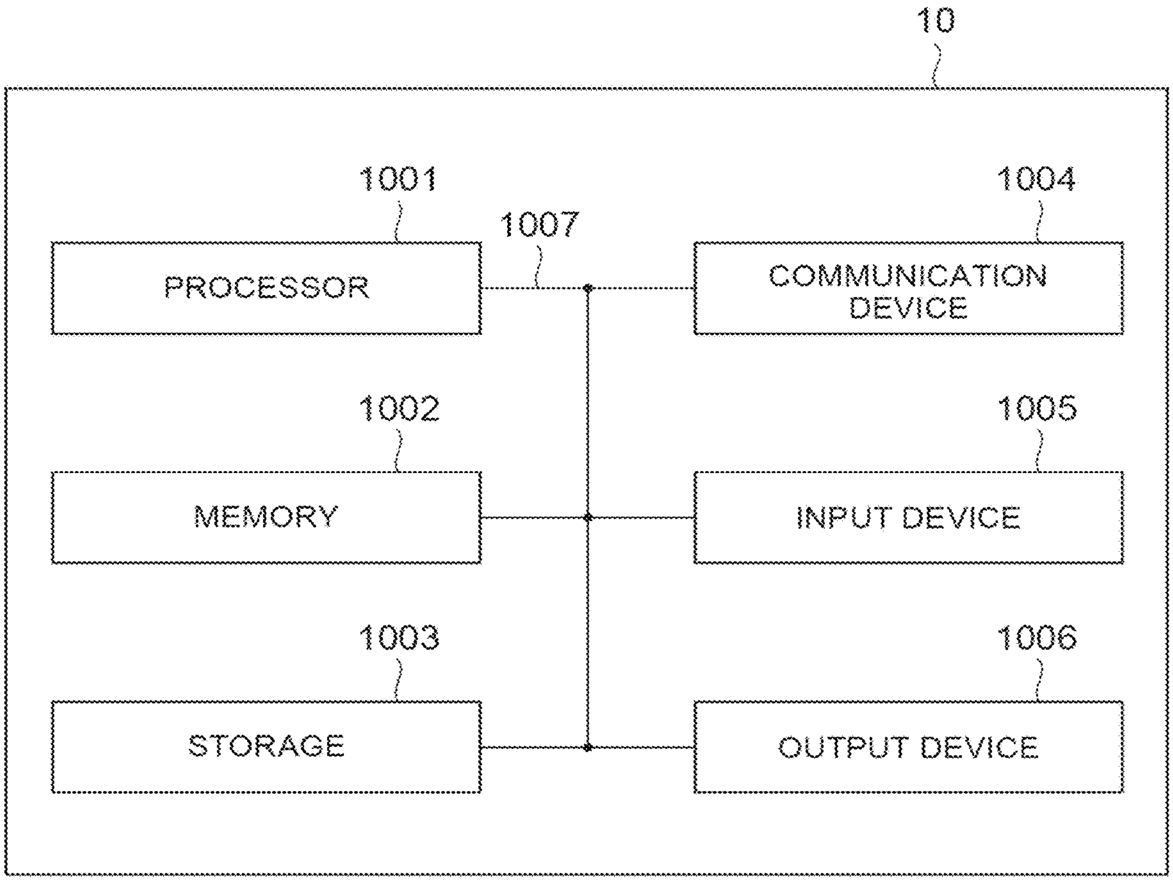
FIG. 12 is a diagram showing a hardware configuration example of the information processing device.

For example, the information processing device 10 according to the present embodiment may function as a computer that executes the processing of the present disclosure. FIG. 12 is a diagram showing an example of a hardware configuration of the information processing device 10. The information processing device 10 may be physically configured as a computer device including a processor 1001, a memory 1002, a storage 1003, a communication device 1004, an input device 1005, an output device 1006, a bus 1007, and the like.

In the following description, the term "device" can be interpreted as a circuit, a device, a unit, or the like. The hardware configuration of the information processing device 10 may include one or a plurality of devices shown in the drawings, or may not include some of the devices.

In a case in which a predetermined software (program) is loaded on hardware such as the processor 1001 and the memory 1002, the processor 1001 performs arithmetic operations to control the communication via the communication device 1004 or control at least one of reading or writing of data in the memory 1002 and the storage 1003, thereby implementing each of the functions of the information processing device 10.

The processor 1001 controls the entire computer by, for example, operating an operating system. The processor 1001 may be configured by a central processing unit (CPU) including an interface with a peripheral device, a control device, an arithmetic device, a register, and the like.

The processor 1001 reads out a program (program code), a software module, data, and the like from at least one of the storage 1003 or the communication device 1004 to the memory 1002, and executes various types of processing in accordance with the program, the software module, the data, and the like. As the program, a program that causes the computer to execute at least a part of the operations described in the above-described embodiment is used. Various types of processing described above are described as being executed by one processor 1001, but may be simultaneously or sequentially executed by two or more processors 1001. The processor 1001 may be implemented by one or more chips. The program may be transmitted from a network via an electric telecommunication line.

The memory 1002 is a computer-readable recording medium, and may be configured by, for example, at least one of a read-only memory (ROM), an erasable programmable ROM (EPROM), an electrically erasable programmable ROM (EEPROM), or a random-access memory (RAM). The memory 1002 may be referred to as a register, a cache, a main memory (main storage device), and the like. The memory 1002 can store an executable program (program code), a software module, and the like for implementing the wireless communication method according to one embodiment of the present disclosure.

The storage 1003 is a computer-readable recording medium, and may be configured by at least one of, for example, an optical disk such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, or a magnetic strip. The storage 1003 may be referred to as an auxiliary storage device. The storage medium described above may be, for example, a database including at least one of the memory 1002 or the storage 1003, a server, or another appropriate medium.

The communication device 1004 is hardware (transceiver) for performing communication between computers via at least one of a wired network or a wireless network, and is also referred to as, for example, a network device, a network controller, a network card, a communication module, and the like. The communication device 1004 may include a high-frequency switch, a multiplexer, a filter, a frequency synthesizer, and the like, for example, in order to implement at least one of frequency division duplex (FDD) or time division duplex (TDD).

The input device 1005 is an input device (for example, a keyboard, a mouse, a microphone, a switch, a button, a sensor, and the like) that receives an input from the outside. The output device 1006 is an output device (for example, a display, a speaker, an LED lamp, and the like) that performs output to the outside. The input device 1005 and the output device 1006 may be configured integrally (for example, a touch panel).

Each device such as the processor 1001 or the memory 1002 is connected by the bus 1007 for communicating information. The bus 1007 may be configured by a single bus or different buses between the respective devices.

The information processing device 10 may include hardware such as a microprocessor, a digital signal processor (DSP), an application-specific integrated circuit (ASIC), a programmable logic device (PLD), or a field programmable gate array (FPGA), and some or all of the functional blocks may be implemented by the hardware. For example, the processor 1001 may be implemented by using at least one of these types of hardware.

The notification of the information is not limited to the aspect/embodiment described in the present disclosure, and other methods may be used. For example, the information notification may be performed by physical layer signaling (for example, downlink control information (DCI), uplink control information (UCI)), upper layer signaling (for example, radio resource control (RRC) signaling, medium access control (MAC) signaling, notification information (master information block (MIB), system information block (SIB))), other signals, or a combination thereof. In addition, the RRC signaling may be called an RRC message, and may be, for example, an RRC connection setup message, an RRC connection reconfiguration message, and the like.

Each aspect/embodiment described in the present disclosure may be applied to at least one of systems using long term evolution (LTE), LTE-advanced (LTE-A), SUPER 3G, IMT-advanced, a 4th generation mobile communication system (4G), a 5th generation mobile communication system (5G), a 6th generation mobile communication system (6G), an xth generation mobile communication system (xG) (x is, for example, an integer or a decimal), future radio access (FRA), new radio (NR), new radio access (NX), future generation radio access (FX), W-CDMA (registered trademark), GSM (registered trademark), CDMA2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), and other appropriate systems, and systems that are expanded, modified, created, or defined based on these systems. Further, a plurality of systems may be combined (for example, a combination of at least one of LTE or LTE-A and 5G) and applied.

An order of the processing procedures, sequences, flowcharts, and the like of each aspect/embodiment described in the present disclosure may be interchanged as long as there is no contradiction. For example, in the method described in the present disclosure, elements of various steps are presented using an illustrative order, and the method is not limited to the presented specific order.

The input and output information and the like may be stored in a specific location (for example, a memory) or may be managed using a management table. The information and the like input and output can be overwritten, updated, or added. The output information and the like may be deleted. The input information and the like may be transmitted to another device.

The judgement may be performed by a value represented by 1 bit (0 or 1), may be performed by a Boolean value (true or false), or may be performed by comparison of numerical values (for example, comparison with a predetermined value).

Each aspect/embodiment described in the present disclosure may be used alone, in combination, or switched with each other in execution. In addition, notification of predetermined information (for example, notification of "X") is not limited to being explicitly performed, and may be performed implicitly (for example, the notification of the predetermined information is not performed).

The present disclosure has been described in detail above, but it is clear to those skilled in the art that the present disclosure is not limited to the embodiment described in the present disclosure. The present disclosure can be implemented as a modification and change aspect without departing from the gist and scope of the present disclosure determined by the description of claims. Therefore, the description of the present disclosure is for illustrative purposes, and is not intended to limit the present disclosure in any way.

The software should be broadly construed to mean commands, command sets, codes, code segments, program codes, programs, sub-programs, software modules, applications, software applications, software packages, routines, sub-routines, objects, executable files, execution threads, procedures, functions, and the like, regardless of whether the software is referred to as software, firmware, middleware, microcode, or a hardware description language, or is called by other names.

Further, software, commands, information, and the like may be transmitted and received via a transmission medium. For example, in a case in which the software is transmitted from a website, a server, or another remote source using at least one of a wired technology (coaxial cable, optical fiber cable, twisted pair, digital subscriber line (DSL), or the like) or a wireless technology (infrared, microwave, or the like), at least one of the wired technology or the wireless technology is included in the definition of the transmission medium.

The information, the signal, or the like described in the present disclosure may be represented by using any of various different technologies. For example, the data, the instruction, the command, the information, the signal, the bit, the symbol, the chip, or the like, which may be referred to throughout the above description, may be represented using a voltage, a current, an electromagnetic wave, a magnetic field or a magnetic particle, a photo field or a photon, or a random combination thereof.

The terms described in the present disclosure and the terms required for grasping the present disclosure may be replaced with terms having the same or similar meanings. For example, at least one of a communication channel or a symbol may be a signal (signaling). Further, the signal may be a message. In addition, a component carrier (CC) may be referred to as a carrier frequency, a cell, a frequency carrier, or the like.

The terms "system" and "network" used in the present disclosure are used interchangeably.

The information, the parameter, and the like described in the present disclosure may be represented by using an absolute value, may be represented by using a relative value from a predetermined value, or may be represented by using corresponding another information. For example, a radio resource may be indicated by an index.

The names used for the above-described parameters are not limited in any way. Further, the mathematical expression or the like using these parameters may be different from those explicitly disclosed in the present disclosure. Various communication channels (for example, PUCCH, PDCCH, and the like) and information elements can be identified by any suitable names, and various names assigned to these various communication channels and information elements are not limited in any way.

As used herein, the term "determining" may encompasses a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

In the present disclosure, the phrase "based on" does not mean "based only on" unless otherwise specified. In other words, the phrase "based on" means both "based only on" and "based at least on".

Any reference to an clement using designations such as "first," "second," and the like used in the present disclosure does not generally limit the quantity or order of the elements. These designations may be used in the present disclosure as a convenient method of distinguishing between two or more elements. Accordingly, the reference to first and second elements does not imply that only two elements can be adopted or that the first element should precede the second element in any manner.

In the present disclosure, in a case in which the terms "include," "including," and variations thereof are used, these terms are intended to be inclusive in the same manner as the term "comprising". Further, the term "or" as used in the present disclosure is not intended to represent an exclusive logical OR.

In the present disclosure, for example, in a case in which an article is added by translation, such as "a", "an", and "the" in English, the present disclosure may include that a noun following these articles is in plural form.

In the present disclosure, the phrase "A and B are different" may mean that "A and B are different from each other". The phrase may mean that "A and B are each different from C". The terms "separated", "coupled", and the like may be interpreted in the same manner as "different".

REFERENCE SIGNS LIST

10: information processing device, 11: action data acquisition unit, 11A: action database, 12: waveform data generation unit, 13: image generation unit, 14: estimation unit, 14A: learning model, 20: mobile terminal, 1001: processor, 1002: memory, 1003: storage, 1004: communication device, 1005: input device, 1006: output device, 1007: bus

The invention claimed is:

1. An information processing device comprising:

a waveform data generation unit that, from action data including an action type and an execution time information related to an acquired action of a user, obtains a timing in time series of an event related to action characteristics of the user and connects the timings adjacent in time series with a predetermined waveform, to generate waveform data for each action; and an image generation unit that generates a two-dimensional image representing the action characteristics of the user by performing power spectrum imaging on the generated waveform data.

2. The information processing device according to claim 1, wherein the waveform data generation unit generates waveform data of each of a plurality of types of actions related to each other and combines a plurality of obtained waveform data by using a predetermined method, to generate one waveform data related to the plurality of actions.

3. The information processing device according to claim 1, further comprising:

an estimation unit that inputs the two-dimensional image generated by the image generation unit and representing the action characteristics of the user, as an explanatory variable, to a learning model that uses action characteristic information of the user as an explanatory variable and uses a predetermined indicator as a response variable, to estimate the indicator.

4. The information processing device according to claim 3, wherein the action is an action related to use of a service to be targeted, and the estimation unit estimates an indicator related to the use of the service of the user by using, as the explanatory variable, a two-dimensional image generated by the image generation unit and representing action characteristics related to the use of the service of the user.

5. The information processing device according to claim 1, wherein the predetermined waveform includes at least one of a sine wave, a cosine wave, or a triangular wave.

6. The information processing device according to claim 1, wherein the power spectrum imaging includes at least one of a continuous Fourier transform or a wavelet transform.

* * * * *